Dec. 29, 1970   C. M. GIBSON   3,550,366
MODULAR REEL FOR HARVESTING MACHINERY
Filed March 13, 1969   2 Sheets-Sheet 2
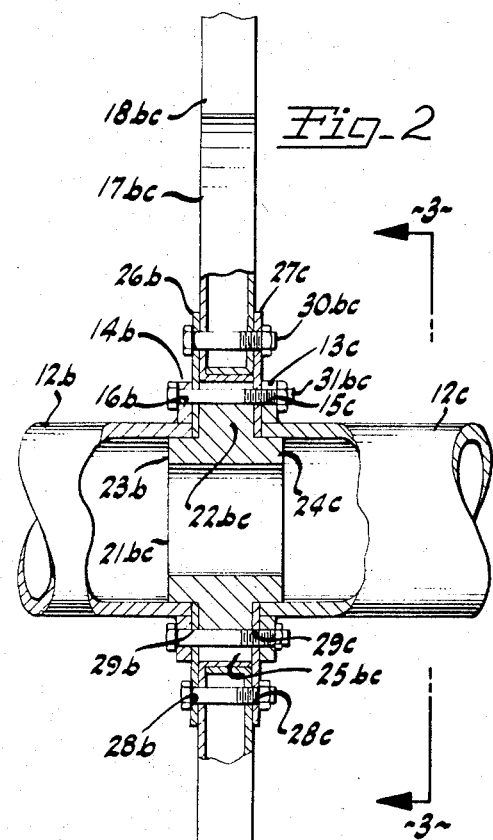
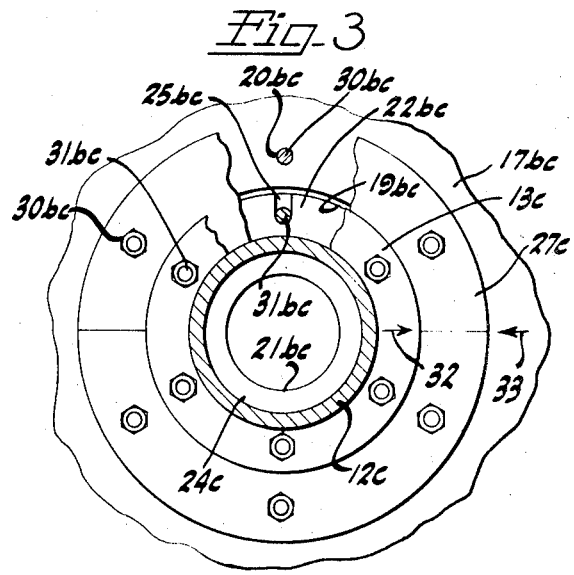
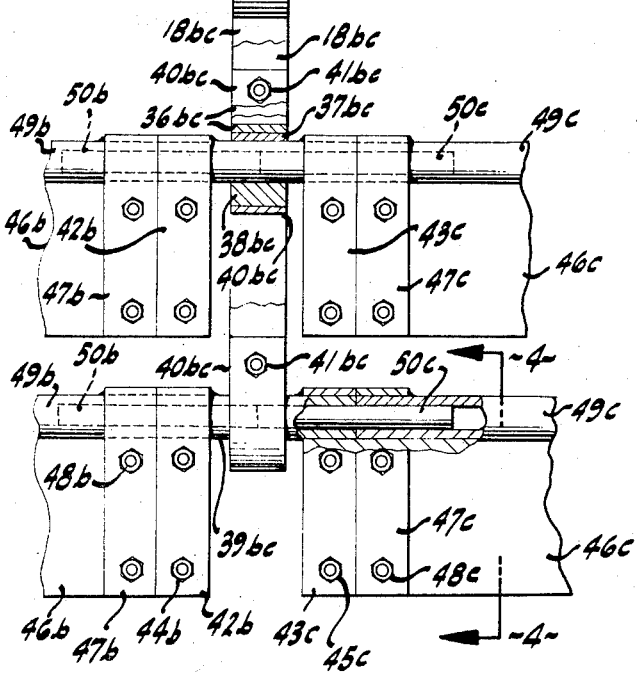
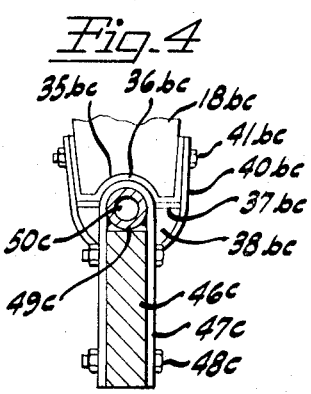
INVENTOR.
Charles M. Gibson
BY
Gardner & Zimmerman
Attorneys

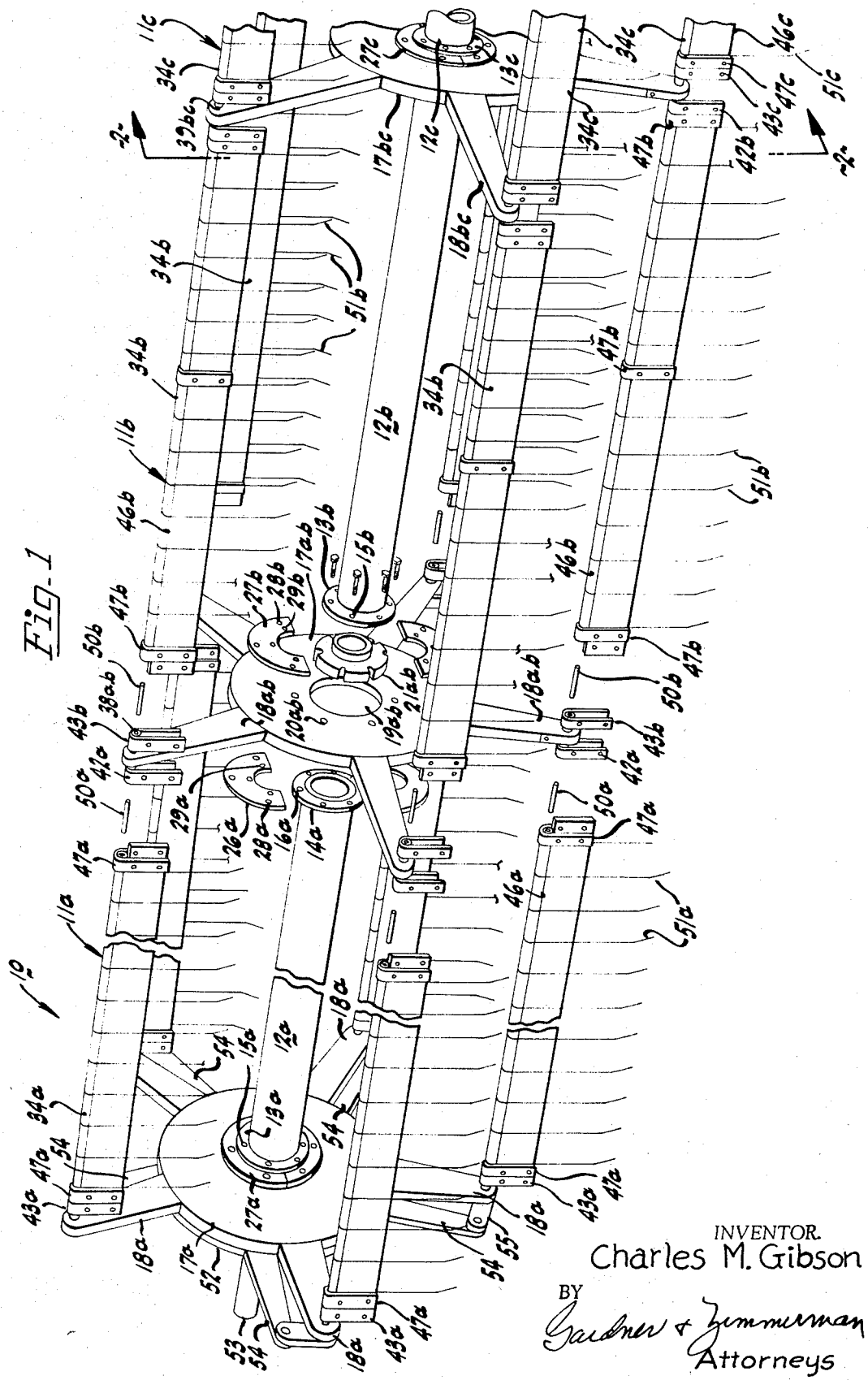

United States Patent Office 3,550,366
Patented Dec. 29, 1970

1

3,550,366
MODULAR REEL FOR HARVESTING MACHINERY
Charles M. Gibson, Stockton, Calif., assignor to Universal Harvester Co., Inc., Stockton, Calif., a corporation of California
Filed Mar. 13, 1969, Ser. No. 807,031
Int. Cl. A01d *57/02*
U.S. Cl. 56—226
16 Claims

ABSTRACT OF THE DISCLOSURE

A reel structure for swathers, combines and like harvesting machinery. The reel structure is of modular construction and enables reels of substantially any desired length to be provided by assembling the requisite number of reel modules having the lengths necessary to aggregate the desired reel length, thereby conveniently accommodating the differing length requirements of a great variety of users. Such modular reel structure includes a plurality of center shafts disposed in axial succession and a plurality of drive spiders respectively connected with the shaft adjacent the ends thereof. The drive spiders are equipped with angularly spaced, radially projecting arms supporting at their outer ends bat assemblies that extend between the aligned arms of successive drive spiders. Main connector structure interconnects the adjacent ends of each successive pair of shafts and the drive spider located thereat, and additional connector structure interconnects the adjacent ends of each successive pair of bat assemblies and the associated radial arm of the drive spider providing the same.

---

This invention relates generally to machinery for harvesting grain, grasses and similar crops, and it relates more particularly to a reel structure for swathers, combines and the like harvesting machinery.

Swathers, combines, and similar harvesting machines typically include relatively large reel structures that are horizontally disposed and, as such machines move through a field, are rotatably driven to gather the growing crop and feed it to a cutter bar which severs the upstanding crop adjacent the ground. These reel structures are generally of two types, one of which is called a bat reel and the other a pick-up reel. Each such type is provided with an elongated center shaft, supported for rotation about the longitudinal axis thereof and equipped radially outwardly therefrom with a plurality of angularly spaced bat assemblies that, in the case of a pick-up reel, have outwardly projecting fingers maintained in a generally vertical orientation as the reel structure rotates about its horizontally disposed, longitudinal axis. As such pick-up reel rotates, the finger-equipped bat assemblies thereof successively sweep downwardly into the crop to gather the same and urge it through the reel and against the cutter bar which severs the crop close to the ground.

Such reel structures vary substantially in length since no single size or length satisfies the harvesting requirements of different users and, as a consequence, manufacturers and suppliers of such reel structures must provide and stock a great variety of sizes which results in considerable inventory expense and often causes inconvenience when a particular size required by a user is not available. In view of this, an object, among others, of the present invention is to provide a modular reel structure for harvesting machinery and the like enabling reels of various lengths to be quickly and easily assembled so as to satisfy the size requests of various users without the necessity of inventorying vast stocks of reel structures of such various lengths.

Another object of the invention is that of providing a modular pick-up reel having a plurality of finger-equipped bat assemblies rotatably supported such that the fingers thereof are maintained in a substantially vertical orientation as the reel structure is rotatably driven while traversing a field having a crop to be harvested thereby. Still another object is in the provision of a modular reel structure of the character described that is strong yet light-weight, and is substantially open throughout the center thereof so that essentially no interference is afforded to movement of the crop therethrough as it is harvested by the reel structure.

A further object is to provide a modular reel structure having certain components serving in common with successive modules; and which reel structure includes main and additional connector structures enabling successive modules to be releasably interconnected in enforced axial alignment. Still a further object is that of providing such a reel structure having drive spiders equipped with radially aligned arms, and in which means are included for orienting such spiders with the arms thereof in axial alignment. Additional objects and advantages, especially as concerns particular features and characteristics of the invention, will become apparent as the specification develops.

An embodiment of the invention is illustrated in the accompanying drawings, in which:

FIG. 1 is a broken, exploded perspective view of a modular reel structure embodying the invention;

FIG. 2 is an enlarged, broken vertical sectional view taken along the line 2—2 of FIG. 1;

FIG. 3 is a broken transverse sectional view taken along the line 3—3 of FIG. 2; and FIG. 4 is a broken fragmentary sectional view taken along the line 4—4 of FIG. 2.

The reel structure illustrated in FIG. 1 is denoted in its entirety with the numeral 10, and it comprises a plurality of modules or sections 11. As respects the following description of the reel structure 10, the same numerals will be used to identify similar components present in the different modules except that the suffixes *a, b, c,* etc. will be added to such numerals wherever appropriate to differentiate between the respectively corresponding components; and in those instances in which a component is common to two successive modules, the two applicable letter suffixes may be used as, for example, the suffixes "*ab*" and "*bc*."

As indicated hereinbefore, the reel structure 10 is intended to traverse a field having a crop ready to be harvested and, accordingly, the reel structure must be attached to or comprise a part of a vehicle operative to propel it about such field. Concerning such vehicle and the relationship of the reel structure thereto, both may be conventional and for purposes of specific identification in this reference, details pertinent thereto appear in the copending patent application of Thomas O'D. Connolly, Ser. No. 528,146, filed Feb. 17, 1966, now abandoned and refiled Apr. 30, 1969 as continuation application Ser. No. 820,683.

The reel structure 10 includes a plurality of longitudinally extending center shafts 12 each of which is hollow, and in the form shown is of cylindrical configuration. The center shafts 12 are respectively associated with the various modules 11 and are adapted to be fixedly interconnected in longitudinal alignment to define the axis of rotation of the reel structure. The center shafts 12 are equipped adjacent each end thereof with an outwardly extending mounting flange that forms a part of main connector structure to be described in greater detail hereinafter. For purposes of identification, such mounting flanges are respectively denoted with the numerals 13 and 14 and, as shown best in FIG. 2, they are welded or otherwise fixedly secured to the respectively associated center shafts 12 so as to prevent relative movement therebetween. The mounting flanges 13 and 14 are respectively provided thereabout with a plurality of angularly spaced apertures or fastener openings 15 and 16 therethrough.

The reel structure 10 further includes a plurality of drive spiders 17 respectively disposed adjacent the end portions of the center shafts 12. More particularly, a drive spider 17 is provided at each outer extremity of the reel structure 10, and a single drive spider is located at the adjacent ends of a pair of successive center shafts 12 so as to be common to two successive reel modules 11. Accordingly, and as shown in FIG. 1, a drive spider 17a is provided at the outer extremity of the reel structure 10 in association with the center shaft 12a, a drive spider 17ab is located at the adjacent end portions of the center shafts 12a and 12b in common with the two modules 11a and 11b, and a drive spider 17bc is disposed in common with the successive modules 11b and 11c. Each drive spider 17 is a substantially planar plate or disc of generally cylindrical configuration equipped with a plurality of angularly spaced, radially extending arms 18 integrally or otherwise fixedly related thereto. Each drive spider 17 is hollow, as shown in FIG. 2, and it is provided centrally with a relatively large opening 19 therethrough. Further, each drive spider 17 has a plurality of angularly spaced apertures or fastener openings 20 spaced outwardly from the opening 19 and used in interconnecting successive modules 11, as will be described hereinafter.

Each main connector structure of which the mounting flanges 13 and 14 form a part, further includes a mounting collar 21 having (as shown best in FIG. 2) a central web 22 or cylindrical configuration dimensioned to seat snugly within the central opening 19 in the associated drive spider 17, and also having axially extending projections 23 and 24 of cylindrical configuration with outer diameters substantially the same as the inner diameter of the center shafts 12 so as to seat snugly therewihtin. The central web 22 of each mounting collar has substantially the same thickness as that of the drive spiders 17, and spaced angularly about such web 22 are a plurality of radially extending slots 25 (as is most evident in FIG. 3). As shown in FIG. 2, each mounting collar 21 is cooperative with successive center shafts 12 so as to seat the adjacent ends thereof upon the axially extending projections 23 and 24 and thereby enforce a condition of coaxiality upon such center shafts.

Successive center shafts 12 and the drive spider 17 associated therewith are united by such main connector structure that includes the mounting flanges 13 and 14 and mounting collar 21, as heretofore explained, and which further includes fastener means comprising a pair of mounting rings 26 and 27 each of which may be segmented (as shown best in FIGS. 1 and 3) to facilitate assembly of such rings with the associated shafts 12 and drive spiders 17. In the form shown, such mounting rings are semi-cylindrical and each is a partial annulus having an angular extent of approximately 180°.

The mounting rings 26 and 27 are respectively provided with a plurality of angularly spaced outer apertures or fastener openings 28, and inwardly therefrom with a plurality of angularly spaced inner apertures or fastener openings 29. The openings 28 in each of the mounting rings 26 and 27 are adapted to respectively align with the openings 20 in the associated drive spider 17 (as is most evident in FIG. 2) so as to respectively pass therethrough a plurality of outer fasteners 30 which may be screw-type fasteners comprising threaded bolts adapted to seat nuts thereon, as illustrated. In an analogous manner, the inner openings 29 respectively provided by the mounting rings 26 and 27 are adapted to respectively align with the openings 15 and 16 provided by the mounting flanges 13 and 14 and with the radially extending slots or openings 25 provided by the associated mounting collar 21 so as to pass fasteners 31 therethrough, as is most evident in FIG. 2. Such fasteners 31 may be screw-type fasteners comprising elongated threaded bolts adapted to receive nuts thereon, as illustrated.

Evidently, two successive reel modules 11 are interconnected one with another by common assembly with a drive spider 17 fixedly secured to the respective center shafts 12 by means of the main connector structure described. More specifically, and considering the juncture of the two modules 11b and 11c illustrated in FIG. 2, the drive spider 17bc common thereto may be assembled with the mounting collar 21bc and mounting rings 26b and 27c and secured together by means of the fasteners 30bc which extend through the openings provided therefor in the mounting rings 26b and 27c and drive spider 17bc (i.e., the outer openings 28b, 28c and openings 20bc).

The two mounting rings 26b and 27c will confine the mounting collar 21bc within the central opening 19bc in the drive spider 17bc because the central web 22bc of the mounting collar is interposed between the mounting rings 26b and 27c. The outer fasteners 30bc are advantageously left loose so that the mounting collar 21bc can be angularly displaced relative thereto for the purpose of aligning the radially extending slots 25bc thereof with the inner fastener openings 29 in the mounting rings 26b and 27c and with the openings 17b and 15c in the mounting flanges 14b and 13c, respectively, so that the inner fasteners 31bc can be inserted therethrough. The fasteners 30bc and 31bc are then all tightened to unify or integrate the center shafts 12b and 12c with the drive spider 17bc.

It will be appreciated that the radially extending arms 18 of the various spiders 17 must be respectively aligned in an axial sense along the reel structure 10, as is indicated most clearly in FIG. 1. In the specific reel structure being considered, each of the drive spiders 17 is equipped with five radially extending arms 18 angularly spaced from each other by equal distances of 72° from center to center. Thus, the drive spiders 17 are aligned with respect to each other so that each set of arms 18a, 18ab and 18bc define a common plane that includes the axis of rotation of the reel structure.

Polarizing or alignment means are provided to enforce such condition of axial alignment upon the respective arms 18, and the alignment means may take various forms such as a particular asymmetry between the angularly spaced openings 20 in the drive spiders 17 and/or the openings 15 and 16 in the mounting flanges 13 and 14 (and respectively corresponding asymmetry in the spacing between the outer openings 28 and/or inner openings 29 in the mounting rings 26 and 27). In the event of such particular orientation of the openings 15 and 16 in the mounting flanges 13 and 14, it will be apparent that the spacing between the radial slots 25 in the mounting collars 21 must be correspondingly changed. Other alignment means may be employed, such as the indicia shown in FIG. 3 which may take the form of marks or arrows 32 and 33 respectively provided on the mounting flanges and drive spiders. In the case of such indicia, alignment thereof during assembly of the center shafts 12 and drive spiders enforces such alignment on the arms 18 of successive drive spiders.

As shown in FIG. 1, each successive pair of aligned arms 18 is adapted to support a bat assembly 34 therebetween. In this respect, each of the radially extending arms 18 is equipped with bearing structure at the outer end thereof providing pivotal support for the bat assemblies 34 associated therewith. More particularly, and referring to FIG. 4, it is seen that each arm 18bc of the drive spider 17bc has at its outer end portion an arcuate recess 35 within which seats a bearing retainer 36 providing an arcuate central section conforming to the configuration of the recess 35 and being equipped with spaced legs extending along the longitudinal edges of the arm 18. Seated within the bearing retainer 36 is an inner bearing segment 37 that cooperates with an outer bearing segment 38 to pivotally support a hollow pin or tube 39 therein.

The inner and outer bearing segments 37 and 38 are held in place, together with the bearing retainer 36, by a bearing cap 40 that extends about the outer bearing segment 38 and has spaced legs extending upwardly along the legs of the retainer 36. A screw fastener 41 extends through apertures provided therefor in the bearing cap 40 and retainer 36 and through an opening aligned therewith in the associated arm 18 to fixedly secure the bearing structure thereto.

The pivot tube 39 is relatively short and is equipped adjacent the ends thereof with inverted, generally U-shaped hangers 42 and 43 which are fixedly secured thereto (as by welding) so as to prevent relative movement therebetween. The hangers 42 and 43 are disposed on opposite sides of the associated drive spider 18 and are adapted to be clamped by a plurality of bolts 44 and 45, respectively, to longitudinally extending bat boards 46 each of which forms a part of an aforementioned bat assembly 34. Each bat board 46 is secured by a plurality of spaced apart hangers 47 and bolts 48 extending therethrough to a longitudinally extending carrier shaft 49 which is hollow, at least adjacent the ends thereof, and is somewhat shorter in length than the spacing between successive arms 18 of the drive spiders 17. The hangers 47 are welded or otherwise fixedly secured to the carrier shaft 49 associated therewith with the result that the associated bat board 46 is rigidly related to such carrier shaft.

Evidently then, since each hanger 43 associated with the pivot tube 39 is clamped to a board 46—which bat board in turn is fixedly clamped to the associated carrier shaft 49—all of the bat boards 46 respectively associated with the successive modules 11 are fixedly interconnected and in consequence thereof, pivot in enforced synchronism relative to the arms 18 supporting the same of the various drive spiders 17. For purposes of strengthening the interconnection of each bat assembly with an associated drive spider 17 and pivot tube 39, a connector pin 50 is inserted into the hollow pivot tube 39 and carrier shaft 49, as shown in FIG. 2. The hangers 42 and 43, hollow pivot pin 39 rotatably supported by an associated spider arm 18, fasteners 44, 45 and 48, and pins 50 comprise additional connector structure by means of which the bat assemblies 34 are interconnected with the control spiders 17.

The bat assemblies 34 further include a plurality of longitudinally spaced fingers 51 which are secured to the associated bat board 46 and depend therefrom, as shown in FIG. 1. In the ordinary instance, the reel structure 10 is horizontally disposed and the fingers 51 are maintained in a generally vertical orientation as the reel rotates because of the rotatable support for each of the bat assemblies 34 and because of the action of one or more control spiders 52. The fingers 51 may be conventional both in terms of structure and the manner in which they are secured to the associated bat board 46 and, for example, may be wire snap lock fingers such as disclosed in the aforementioned copending patent application, Ser. No. 528,146.

Usually a control spider 52 will be provided at each end of the reel structure 10 and supports the reel structure for rotation on stub shafts 53 adapted to be journalled in bearings provided therefor in the propelling vehicle. The control spider 52 shown is provided with a plurality of radially extending arms 54 corresponding in number to the number of arms 18 on the drive spider 17 which, in the particular reel structure 10 being considered, results in the control spider 52 having five such arms 54. Each arm 54 of the control spider 52 is connected through a linkage 55 to the carrier shaft 49 supported by an adjacent arm 18 of the drive spider 17a so as to effect rotation of each such carrier shaft relative to the reel structure 10 as it is rotatably driven, thereby maintaining the fingers 51 in a generally vertical orientation at all times as the reel structure traverses an arcuate path of 360°.

As respects the present invention, each control spider 52 and its connection with the adjacent drive spider 17, bat assemblies 34 supported thereby, and shafts 53 may all be conventional; and for more details concerning the same, reference may be made to the aforementioned copending patent application, Ser. No. 528,146. It may be observed that the control spider 52 is usually adjustable so that the orientation of the fingers 51 may be changed slightly to assure their most efficient coaction with the particular crop being harvested by the reel structure.

As mentioned hereinbefore, each of the center shafts 12 is hollow which reduces the weight of the reel structure 10 and, similarly, each of the drive spiders 17 is hollow as shown in FIG. 2—being formed in two sections interconnected with the annular flanges thereof superposed and welded or otherwise rigidly connected to each other. Such construction of the drive spiders 17 further reduces the weight of the reel structure 10, thereby minimizing the power requirements for rotatably driving the same as it is propelled along a field containing a crop to be harvested thereby. Although relatively light-weight and modular in construction, the reel structure is quite strong and is open throughout the interior thereof so as to cause little interference with the crop being harvested which is picked up by the fingers 51 and urged thereby, in conjunction with the bat boards 46, toward the cutter bar (not shown) which severs the crop in close proximity to the ground.

Reel structures 10 can be constructed which are as long or as short as required for any particular installation or use simply by assembling a plurality of modules 11 having the lengths necessary (which may be the same or differ one from another) to aggregate the requisite length for the composite reel structure. Evidently, the shorter the incremental lengths of the modules, the more versatile is the length possibilities afforded thereby. Although a drive spider 17 is provided adjacent each end of a center shaft 12, it is apparent that a single drive spider serves in common between two successive modules 11, thereby reducing the number of drive spiders otherwise required were each module 11 a complete integer. Similarly, each main connector structure serves with the associated drive spider 17 to interconnect successive modules 11 and, analogously, each additional connector structure serves with the associated arm 18 of a single drive spider 17 to interconnect successively aligned bat assemblies 34 of successive modules 11.

While in the foregoing specification an embodiment of the invention has been set forth in considerable detail to provide a complete and adequate disclosure thereof, it will be apparent to those skilled in the art that numerous changes may be made in such details without departing from the spirit and principles of the invention.

What is claimed is:

1. In a modular reel structure for harvesting machinery and the like; a plurality of longitudinally extending center shafts aligned with each other in axial succession and defining the axis of rotation of said reel structure; a plurality of drive spiders having a plurality of angularly spaced radially extending arms and being coaxially mounted along said shafts adjacent the respective ends thereof with said arms oriented in axial alignment; a plurality of bat assemblies respectively interposed between each successive pair of axially aligned spider arms and being supported thereby; and main connector structure interconnecting the adjacent ends of each successive pair of shafts and the drive spider located thereat to unite the same and prevent relative axial and rotational movements therebetween; whereby reel structures of substantially any desired length can be selectively constructed by providing a plurality of center shafts having lengths that aggregate such desired length, drive spiders, bat assemblies, and main connector structures and interconnecting the adjacent ends of each successive pair of shafts and the drive spider located thereat as aforesaid.

2. The reel structure of claim 1 in which said main connector structure includes outwardly extending mounting flanges constrained upon each of said shafts adjacent the ends thereof; a mounting collar engageable with the adjacent end portions of successive shafts to align the same; each of said drive spiders having a central opening therethrough seating the associated mounting collar therein; and fastener means fixedly interconnecting the associated mounting flanges, mounting collar and drive spider to unite successive shafts and the associated drive spider as aforesaid.

3. The reel structure of claim 2 in which said fastener means comprises a pair of mounting rings respectively overlying the associated drive spider on opposite sides thereof and disposed intermediate said mounting collar and the respectively facing mounting flanges; and further comprises a plurality of outer fasteners fixedly interconnecting said mounting rings and drive spider and a plurality of inner fasteners fixedly interconnecting said mounting flanges, mounting collar, and mounting rings.

4. The reel structure of claim 3 in which each of said mounting rings is divided into a plurality of separable segments to facilitate mounting thereof.

5. The reel structure of claim 4 in which each of said center shafts is hollow, and in which said mounting collar is provided with a central web and with axially extending projections telescopically receivable within the adjacent end portions of successive shafts to align the same.

6. The reel structure of claim 2 in which each of said center shafts is hollow, and in which said mounting collar is provided with a central web and with axially extending projections telescopically receivable within the adjacent end portions of successive shafts to align the same.

7. The reel structure of claim 1 in which said bat assemblies are pivotally supported by said spider arms; and further including additional connector structure interconnecting the adjacent ends of axially aligned bat assemblies with the respectively associated spider arms, and mechanical control means connected with each of said bat assemblies for maintaining them in the same general orientation as said reel structure rotates about its aforesaid axis of rotation.

8. The reel structure of claim 7 constituting a pick-up reel structure adapted to have the axis of rotation thereof horizontally disposed; and in which each of said bat assemblies is equipped with a plurality of outwardly projecting fingers maintained in a substantially vertical disposition by the aforesaid general orientation of said bat assemblies.

9. The reel structure of claim 8 in which said additional connector structure includes a pin rotatable with respect to and extending through the associated spider arm in substantially parallel relation with such axis of rotation of said reel structure, and further includes attachment members connecting the respectively associated bat assemblies with said pin so as to rotate therewith.

10. The reel structure of claim 8 in which said main connector structure includes outwardly extending mounting flanges constrained upon each of said shafts adjacent the ends thereof; a mounting collar engageable with the adjacent end portions of successive shafts to align the same; each of said drive spiders having a central opening therethrough seating the associated mounting collar therein; and fastener means fixedly interconnecting the associated mounting flanges, mounting collar and drive spider to unite successive shafts and the associated drive spider as aforesaid.

11. The reel structure of claim 10 in which each of said center shafts is hollow, and in which said mounting collar is provided with a central web and with axially extending projections telescopically receivable within the adjacent end portions of successive shafts to align the same.

12. The reel structure of claim 11 in which said additional connector structure includes a pin rotatable with respect to and extending through the associated spider arm in substantially parallel relation with such axis of rotation of said reel structure, and further includes attachment members connecting the respectively associated bat assemblies with said pin so as to rotate therewith.

13. The reel structure of claim 12 in which said fastener means comprises a pair of mounting rings respectively overlying the associated drive spider on opposite sides thereof and disposed intermediate said mounting collar and the respectively facing mounting flanges; and further comprises a plurality of outer fasteners fixedly interconnecting said mounting rings and drive spider and a plurality of inner fasteners fixedly interconnecting said mounting flanges, mounting collar, and mounting rings.

14. The reel structure of claim 13 in which each of said mounting rings is divided into a plurality of separable segments to facilitate mounting thereof.

15. The reel structure of claim 14 and further including alignment means for assuring axial alignment of the respective radial arms of successive drive spiders to facilitate interconnection of said bat assemblies therewith.

16. The reel structure of claim 15 in which said alignment means comprises indicia carried by each drive spider and said mounting flanges.

References Cited

UNITED STATES PATENTS

| | | | |
|---|---|---|---|
| 2,252,180 | 8/1941 | Hume | 56—226 |
| 2,627,158 | 2/1953 | Van Sickle | 56—227X |
| 2,795,921 | 6/1957 | Hume | 56—226 |
| 2,823,511 | 2/1958 | Beaty | 56—226 |
| 3,468,109 | 9/1969 | Reimer | 56—220 |

FOREIGN PATENTS

| | | | |
|---|---|---|---|
| 49,292 | 8/1911 | Austria | 56—226 |

LOUIS G. MANCENE, Primary Examiner

J. A. OLIFF, Assistant Examiner